(12) United States Patent
Hodgin

(10) Patent No.: US 9,053,459 B2
(45) Date of Patent: *Jun. 9, 2015

(54) TIME TRACKING SYSTEM AND METHOD OF USER

(71) Applicant: International Business Machines Corporation, Armonk, NY (US)

(72) Inventor: Ryan E. Hodgin, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/451,631

(22) Filed: Aug. 5, 2014

(65) Prior Publication Data

US 2014/0344122 A1 Nov. 20, 2014

Related U.S. Application Data

(63) Continuation of application No. 13/087,822, filed on Apr. 15, 2011, which is a continuation of application No. 11/769,564, filed on Jun. 27, 2007, now abandoned.

(51) Int. Cl.

| *G06Q 10/10* | (2012.01) |
| *G06Q 10/00* | (2012.01) |
| *G06Q 30/04* | (2012.01) |
| *G07C 1/02* | (2006.01) |
| *H04L 12/58* | (2006.01) |

(Continued)

(52) U.S. Cl.
CPC .............. *G06Q 10/10* (2013.01); *G06Q 10/103* (2013.01); *G06Q 10/00* (2013.01); *G06Q 10/1091* (2013.01); *G06Q 30/04* (2013.01); *G07C 1/02* (2013.01); *H04L 51/046* (2013.01); *G06Q 20/145* (2013.01); *G06Q 30/016* (2013.01)

(58) Field of Classification Search
CPC .............................. G06Q 10/103; G06Q 10/10
See application file for complete search history.

(56) References Cited

U.S. PATENT DOCUMENTS

| 5,696,702 A | 12/1997 | Skinner et al. |
| 5,970,468 A | 10/1999 | Bull |
| 6,917,610 B1 | 7/2005 | Kung et al. |

(Continued)

OTHER PUBLICATIONS

Office Action (Aug. 14, 2014) for U.S. Appl. No. 13/087,822, filed Apr. 15, 2011.

(Continued)

*Primary Examiner* — Ryan Zeender
*Assistant Examiner* — H Rojas
(74) *Attorney, Agent, or Firm* — Schmeiser, Olsen & Watts, LLP; William E. Schiesser

(57) ABSTRACT

A method and system for billing for time spent in an instant message session by a service person for a project for a customer. Responsive to the instant message session during which an instant message is received by a user from a sender, (i) retrieving the sender's name from the instant message; (ii) determining that the sender does not exist in a defined project; (iii) determining that the instant message does not contain any keywords associated with a project; (iv) determining that the sender has not been associated with a previous project; (v) determining that the sender has a profile having a keyword that the user has associated with a first project; (vi) associating the first project with the instant message; (vii) determining a charge to the first project for labor of the service person based on a duration of the instant message session. The user is the service person.

9 Claims, 6 Drawing Sheets

(51) Int. Cl.
*G06Q 20/14* (2012.01)
*G06Q 30/00* (2012.01)

(56) References Cited

U.S. PATENT DOCUMENTS

| | | |
|---|---|---|
| 2001/0056389 A1 | 12/2001 | Fair et al. |
| 2002/0174134 A1 | 11/2002 | Goykhman |
| 2003/0004752 A1 | 1/2003 | Banerjee et al. |
| 2003/0187800 A1 | 10/2003 | Moore et al. |
| 2003/0193961 A1 | 10/2003 | Moore et al. |
| 2003/0204367 A1 | 10/2003 | Hartigan et al. |
| 2004/0236650 A1 | 11/2004 | Zapiec et al. |
| 2005/0187839 A1 | 8/2005 | Butera et al. |
| 2005/0192822 A1 | 9/2005 | Hartenstein et al. |
| 2006/0010051 A1 | 1/2006 | Sattler et al. |
| 2008/0250109 A1 | 10/2008 | Jakobson |
| 2009/0006228 A1 | 1/2009 | Hodgin |

OTHER PUBLICATIONS

Amendment (Nov. 11, 2014) for U.S. Appl. No. 13/087,822, filed Apr. 15, 2011.
Office Action (mail date Sep. 5, 2008) for U.S. Appl. No. 11/769,564.
Final Office Action (mail date Jan. 12, 2009) for U.S. Appl. No. 11/769,564.
Office Action (Mail date Aug. 24, 2012) for U.S. Appl. No. 13/087,822, filed Apr. 15, 2011, Conf. No. 7079.
Amendment (filed Sep. 11, 2012) for U.S. Appl. No. 13/087,822, filed Apr. 15, 2011, Conf. No. 7079.
Restriction Requirement (Mail date Jan. 10, 2013) for U.S. Appl. No. 13/087,822, filed Apr. 15, 2011, Conf. No. 7079.
Response to Restriction (filed Jan. 22, 2013) for U.S. Appl. No. 13/087,822, filed Apr. 15, 2011, Conf. No. 7079.
Final Office Action (Mail date Apr. 5, 2013) for U.S. Appl. No. 13/087,822, filed Apr. 15, 2011, Conf. No. 7079.
Final Amendment (filed Jul. 31, 2013) for U.S. Appl. No. 13/087,822, filed Apr. 15, 2011, Conf. No. 7079.
Advisory Action (Mail date Aug. 9, 2013) for U.S. Appl. No. 13/087,822, filed Apr. 15, 2011, Conf. No. 7079.
RCE (filed Sep. 4, 2013) for U.S. Appl. No. 13/087,822, filed Apr. 15, 2011, Conf. No. 7079.
Office Action (Mail date Feb. 10, 2014) for U.S. Appl. No. 13/087,822, filed Apr. 15, 2011, Conf. No. 7079.
Amendment (filed May 7, 2014) for U.S. Appl. No. 13/087,822, filed Apr. 15, 2011, Conf. No. 7079.
Notice of Allowance (Mail date Jun. 19, 2014) for U.S. Appl. No. 13/087,822, filed Apr. 15, 2011, Conf. No. 7079.
Patent Application for U.S. Appl. No. 14/451,592, filed Aug. 5, 2014, Conf. No. 5502.
Notice of Allowance (mail date Feb. 26, 2015) for U.S. Appl. No. 14/451,595, filed Aug. 5, 2014.
Notice of Allowance (mail date Feb. 9, 2015) for U.S. Appl. No. 13/087,822, filed Apr. 15, 2011.

TIME TRACKING SYSTEM AND METHOD OF USER

This application is a continuation application claiming priority to Ser. No. 13/087,822, filed Apr. 15, 2011, which is a Continuation of Ser. No. 11/769,564, filed Jun. 27, 2007, now Abandoned.

FIELD OF THE INVENTION

The invention generally relates to a system and method of managing time and, more particularly, to a system and method for automatically tracking and managing time.

BACKGROUND OF THE INVENTION

Instant messaging is a form of real-time communication between two or more people based on typed text. The text is conveyed via computers connected over a network such as the Internet. Instant messaging requires an instant messaging client that connects to an instant messaging service. Allowing for instantaneous communication, instant messaging can thus transmit information quickly and efficiently, as well as receive an immediate acknowledgement or reply.

Instant messaging has become very popular within the business community as it allows users to communicate more freely and openly, while also increasing productivity. However, instant messaging systems are limited in their functionality. By way of example, most instant messaging systems only allow the user to set an online status or away message so peers are notified when the user is available, busy, or away from the computer.

Within the services sector, the accurate tracking of time spent on a project or task is key since the amount of time spent on a project directly relates to the amount billed to clients. In the services industry, individual employees may work on many different projects at one time and with the improvement in collaboration technologies, they must manage interruptions that cause them to stop work on one project and redirect their attention to another project. The most common way these interruptions happen is through the instant messaging system.

Presently, there is no way within the instant messaging system to keep track of these interruptions or associate current projects worked by the employee with the person requesting their attention. This tracking is currently done manually or in some cases the interruptions are ignored since the time spent may not seem significant. However, when the time spent on many different interruptions is added, it could result in a significant amount of time and hence cost to the employer.

Accordingly, there exists a need in the art to overcome the deficiencies and limitations described hereinabove.

SUMMARY OF THE INVENTION

In a first aspect of the invention, a system comprises a time tracking tool configured to be integrated with an instant messaging system. The time tracking tool is configured to associate a received instant message with one or more projects and track a session time in which the received instant message is active.

In another aspect of the invention, a method for deploying an application for managing time is provided. The method comprises providing a computer infrastructure being operable: receive an instant message; associate the instant message with one or more projects; and track time for the associated one or more projects and a time the instant message is actively displayed on a display.

In another aspect of the invention, a computer program product comprising a computer usable medium having readable program code embodied in the medium is provided. The computer program product includes at least one component to perform the functions of the computer infrastructure.

DETAILED DESCRIPTION OF EMBODIMENTS OF THE INVENTION

The invention generally relates to a system and method of managing time and, more particularly, to a system and method for automatically tracking and managing time in an electronic application. More specifically, in embodiments, the system and method of the invention is a time tracking tool implemented with instant messaging systems. The time tracking tool is configured to associate a project with a received instant message and track time for a project (associated with an instant message) during the active session. The system and method can be implemented with any flexible instant messaging system such as, for example, IBM Lotus Sametime®. (IBM, Lotus and Sametime are trademarks of International Business Machines Corporation in the United States, other countries, or both.)

More specifically, the invention can be implemented as a program product tool which is configured to track time expended by a service/support person (such as computer support) to a customer for billing purposes. In operation, when a service/support person receives an instant message, the program tool correlates the instant message with a project or customer for billing purposes. The program tool can search for keywords in the instant message that indicate the project and customer or attempt to correlate the sender of the instant message to a project and customer. The program tool can determine which senders are associated with each project and customer based on, for example, department, directory information, billing records by the service/support person in assisting the same sender, etc. The program tool is also configured to calculate the duration of the instant message session to determine the amount to invoice the customer for the instant message session (e.g., multiply the duration of the instant message session by an hourly rate). The program tool can also display the billing information to the support/service person for confirmation.

System Environment

Figure 1:
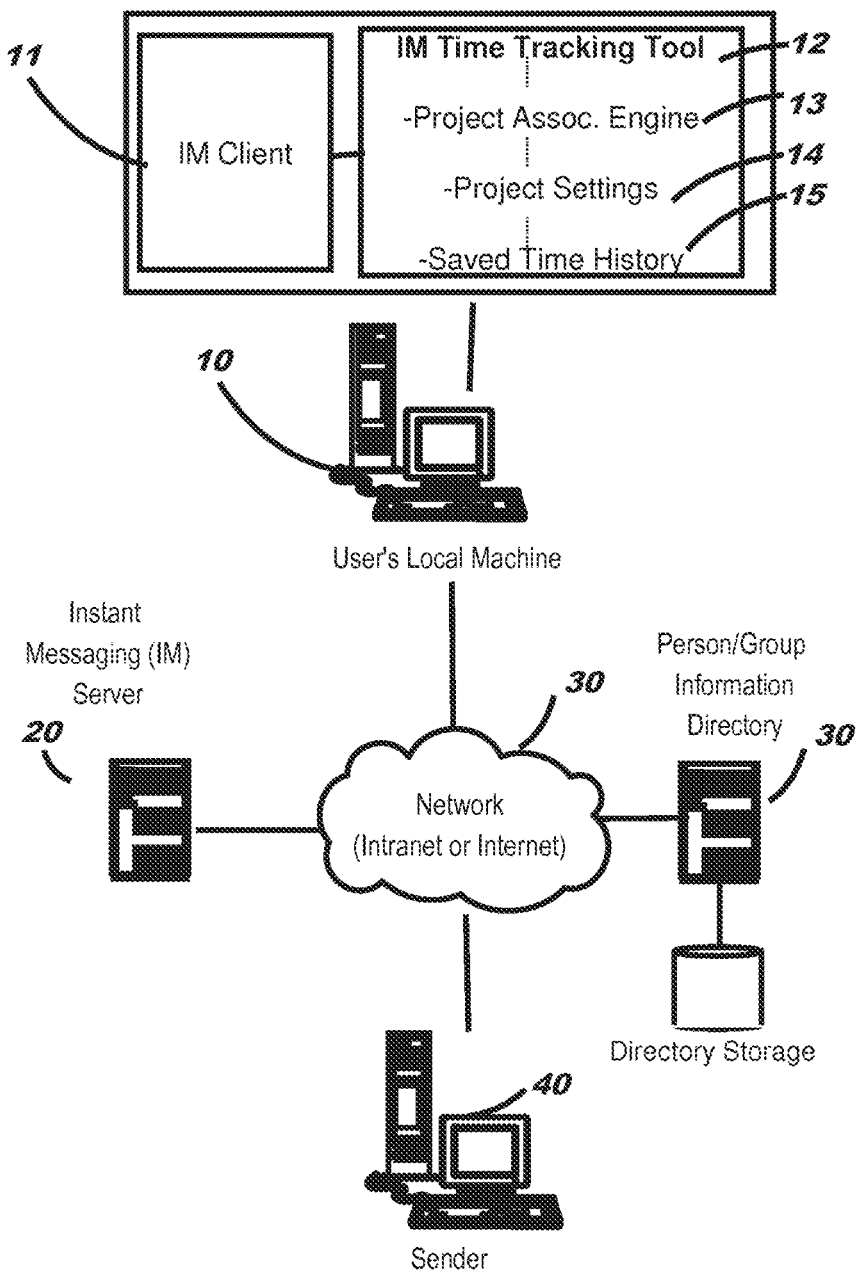
FIGS. 1 and 2 show illustrative environments and systems in accordance with the invention.

FIG. 1 shows an illustrative environment and system in accordance with the invention. A local machine 10 is configured to receive instant messages from a sender 40 via the use of an instant message client 11, instant message (IM) server 20 and network connection 35. As should be understood by those of skill in the art, the IM client 11 is software that provides the functionality to send and receive IMs. The IM client 11 also provides the functionality to connect to the IM server 20 and retrieve profile information about the sender when the user 10 receives a message. The sender 40 is a person using the IM service and contacting the user 10.

Like the user, the sender is connected to the IM Service through the network 35 and has a profile defined in a Person/Group Information Directory 30. The Person/Group Information Directory 30 may be, as one non-limiting example, Bluepages™. (Bluepages is a trademark of International Business Machines Corporation in the United States, other countries, or both.)

As should be understood by those of skill in the art, the IM Server 20 manages IM connections and links the IM clients together. The IM Server 20 also manages information for specific IM clients and is able to retrieve information on the user signed into IM clients from a Person/Group Information Directory 30.

The local machine 10 also communicates with a time tracking tool 12. The time tracking tool 12 is a tool that tracks the amount of time spent in a chat session and associates that time with a specific project, as discussed herein. The total amount of time by project is calculated by the tool and displayed to the user 10 in order to invoice time to the project accurately. The time tracking tool 12 includes a Project Association Engine 13, Project Settings 14 and Saved Time History 15.

The Project Association Engine 13 is configured to make the association between the person sending the IM (Sender) and the project that belongs to the person. (The rules behind this engine are described in FIGS. 4A and 4B.) The Project Settings 14 is the component of the IM Time Tracking Tool 12 that is configured to manage settings that are created by the user or service provider in order to make accurate associations between senders/messages and the projects. In embodiments, the user 10 is able to add an individual or multiple individuals to a project to define that any message received from a listed person should be considered to be from a specific project. Instead of linking specific individuals to a project, the user can also add a dynamic group of people so that as the group changes, the linkage does not change. In addition, the user can add keywords such that if someone who is not linked to the project sends a message to the user 10 with a defined keyword in the text of the message, the tool can make the proper association. The Saved Time History 15 is a component that is configured to store the individual time tracking records. The Saved Time History 15 allows for the loading and modification of records and also reports on time totals for projects based on specific time periods.

The Person/Group Information Directory 30 is a directory of information related to the users of the IM service. The Person/Group Information Directory 30 can contain information such as, for example, the user's username, first name, last name, title, email address, other types of IDs, assigned projects, etc. The Person/Group Information Directory 30 can also contain groups that reference one to many different users and could be queried to determine the list of users.

Figure 2:
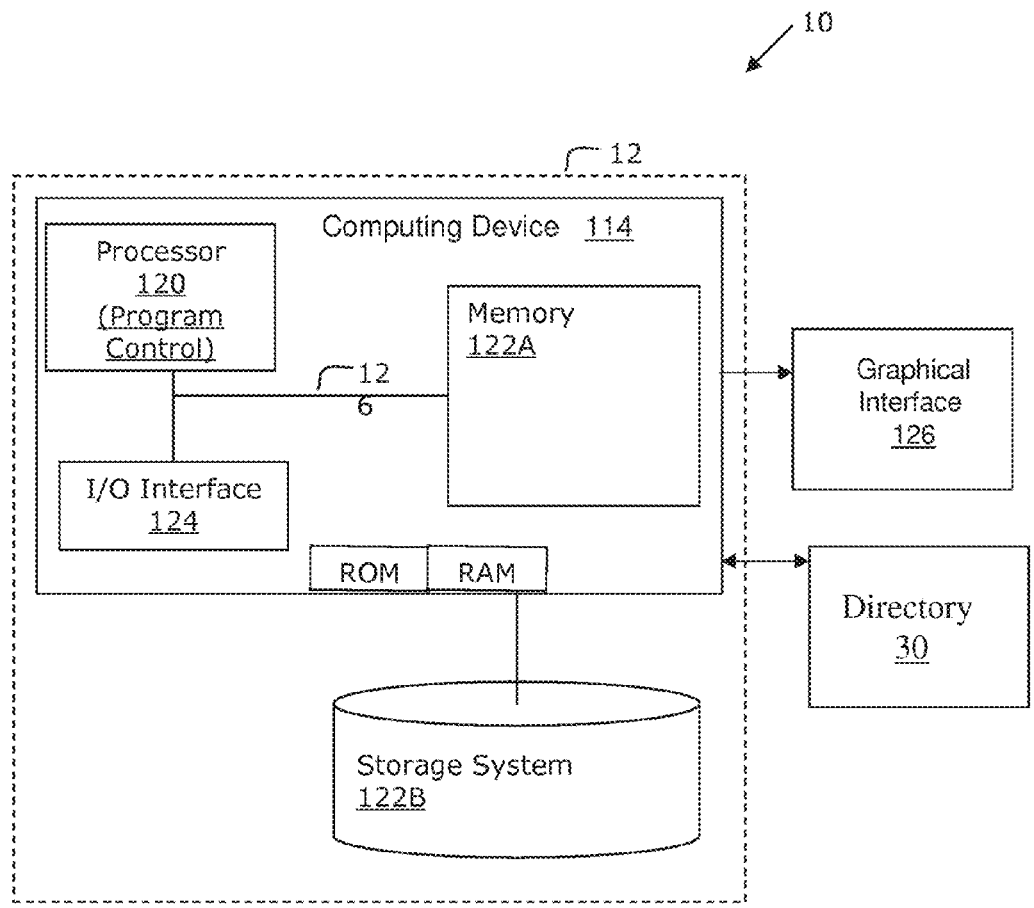

FIG. 2 shows an illustrative environment 10 for managing the processes in accordance with the invention. The illustrative environment may be personal computer, for example, implementing the tracking tool 12 of FIG. 1. To this extent, the environment 10 includes a computer infrastructure (tracking tool) 12 that can perform the processes described herein. In particular, the computer infrastructure 12 includes a computing device 114 operable to track time based on specific projects, amongst the other features of the invention as described herein.

By way of more specific discussion, in embodiments, the computing device 114 allows the user to specify or define projects that are currently active. Within these project definitions, the user can associate keywords, groups, or individuals with the project. Similarly, a service provider can also define the projects, while associating keywords, groups, or individuals with the project. The service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from one or more third parties.

Once the projects are defined and associations made, when a new instant message is received, the computing device 114 determines an association between the project and the sender. In embodiments, the computing device 114 determines an association by, for example:

Checking if the sender is associated to a specific project or is from a group that has been associated with a specific project;

Searching through the text of the message to find keywords that were associated with the project;

Determining if the sender has been previously associated with a project; and/or

Defaulting to the project the user has worked on most often.

In embodiments, the user can also manually determine the association if not correctly determined by the computing device 114.

Once a match is found, it can be displayed to the user and modified in case the match is not correct. Once the correct association is made, the computing device 114 tracks the amount of time spent in the session (chat). The computing device 114 is also configured to allow the user to stop or pause the time tracked. Once the session is complete, the computing device 114 is configured to add the amount of time spent in the session to the time for the project. That is, the computing device can calculate the time spent, amount to be billed to a client, etc. associated with a specific project. The time can be viewed on a display.

The computing device 114 includes a processor 120, a memory 122A (including RAM and ROM), an input/output (I/O) interface 124, and a bus 126. The memory 122A can include local memory employed during actual execution of program code, bulk storage, and cache memories which provide temporary storage of at least some program code in order to reduce the number of times code must be retrieved from bulk storage during execution. Further, the computing device 114 is in communication with a storage system 122B and the Person/Group Information Directory 30. The computing device may include keyboards, displays, pointing devices, etc.

In general, the processor 120 executes computer program code (also referred to as program control), which is stored in memory 122A and/or storage system 122B. The computer program code is configured to execute the processes of the system and method as described herein. While executing computer program code, the processor 120 can read and/or write data to/from memory 122A, storage system 122B, and/or I/O interface 124. The bus 126 provides a communications link between each of the components in the computing device 114. A graphical display 126 is also provided for displaying the IM and related information as presented herein. The term "computer-readable storage device" does not encompass a signal propagation media such as a copper cable, optical fiber and wireless transmission media.

The computing device 114 can comprise any general purpose computing article of manufacture capable of executing computer program code installed thereon (e.g., a personal computer, server, handheld device, etc.). However, it is understood that the computing device 114 is only representative of various possible equivalent-computing devices that may perform the processes described herein. To this extent, in embodiments, the functionality provided by computing device 114 can be implemented by a computing article of manufacture that includes any combination of general and/or specific purpose hardware and/or computer program code. In each embodiment, the program code and hardware can be created using standard programming and engineering techniques, respectively.

Example of Operation

Figure 3:
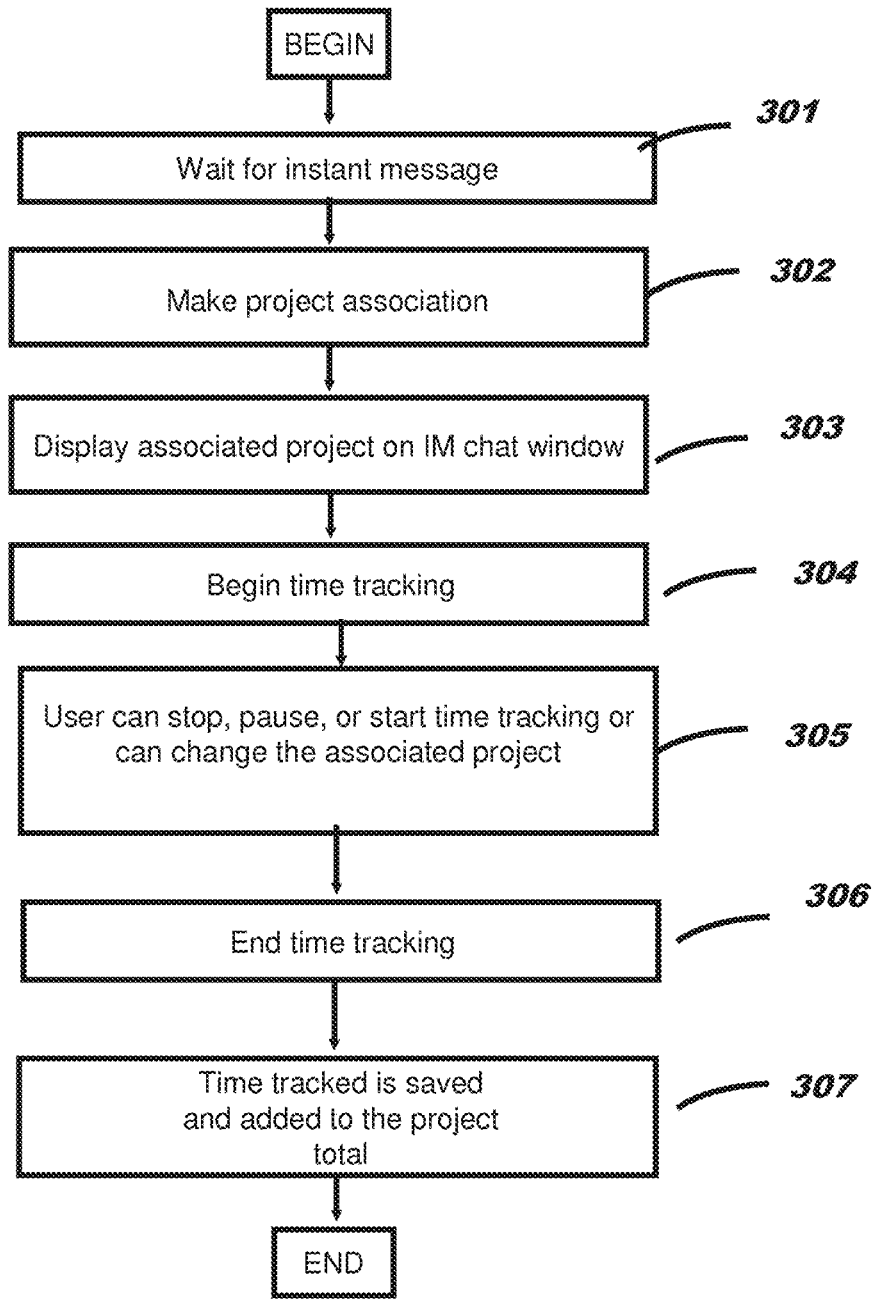
FIGS. 3, 4A and 4B are flow diagrams of processing steps implementing aspects of the invention.
Figure 4A:
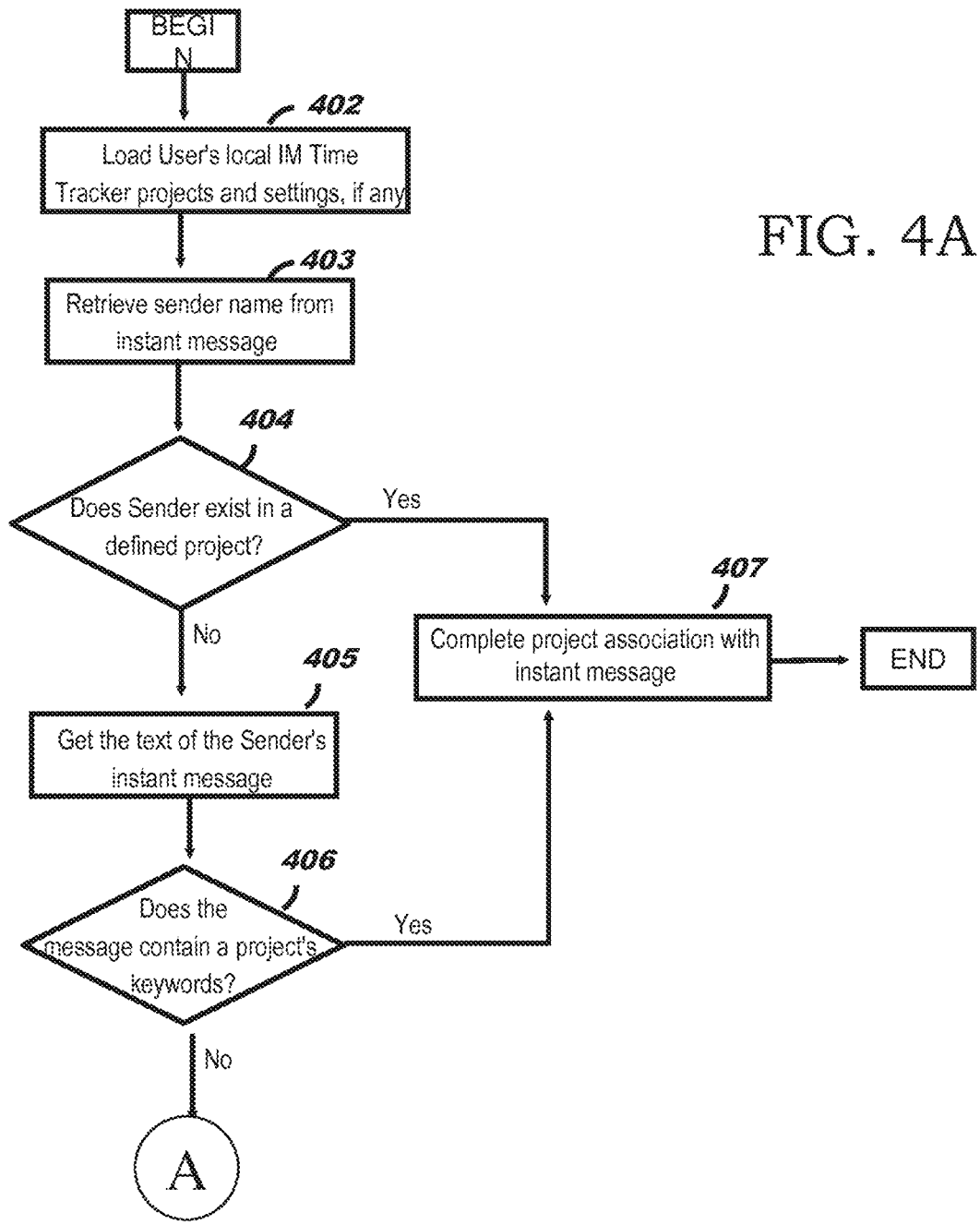

FIGS. 3-4A are flow diagrams implementing steps of the invention which may be implemented in the environment of FIGS. 1 and/or 2. FIGS. 3-4A may equally represent a high-level block diagram of the invention. The invention can take the form of an entirely hardware embodiment, an entirely software embodiment or an embodiment containing both hardware and software elements. The software elements may be firmware, resident software, microcode, etc. Furthermore, the invention can take the form of a computer program product accessible from a computer-usable or computer-readable medium providing program code for use by or in connection with a computer or any instruction execution system as described with reference to FIG. 2.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

In FIG. 3, at step 301, the program control waits for an instant message. In this processing stage, once the user starts the IM client, the program control loads the time tracking tool and waits until a message is received before it performs its function. At step 302, once a message is received, the program control will make an association between the chat session and a project that time should be tracked against. This function is described in detail in FIGS. 4A and 4B.

At step 303, once the match has been made, the project is displayed on the chat window. This allows the user to see which project is associated with the session. At step 304, once the user selects the window and gives focus to it, the application begins tracking time. As the session continues, the amount of time is increased and displayed on the display, e.g., chat window.

At step 305, the user can stop, pause, or start time tracking or can change the associated project. For example, the user can click buttons on the screen to stop, pause, or start the time tracking function that is running in the background, as well as keep track of the amount of time spent in the session. The user can also change the project that was associated with the chat session to another project or no association. (See FIG. 5 for an exemplary display.)

At step 306, once the window is closed, the session is considered complete and the program control will stop tracking the time. At step 307, the tracked time is saved and added to the project total. In embodiments, at this processing stage, since the tracking of the time has stopped, the program control will save the time spent on the chat session in the Saved Time History and/or will calculate/update the new total time for the project based on this most recent session. At step 307, the tracked time can be exported to any configured time tracking program.

Figure 4B:
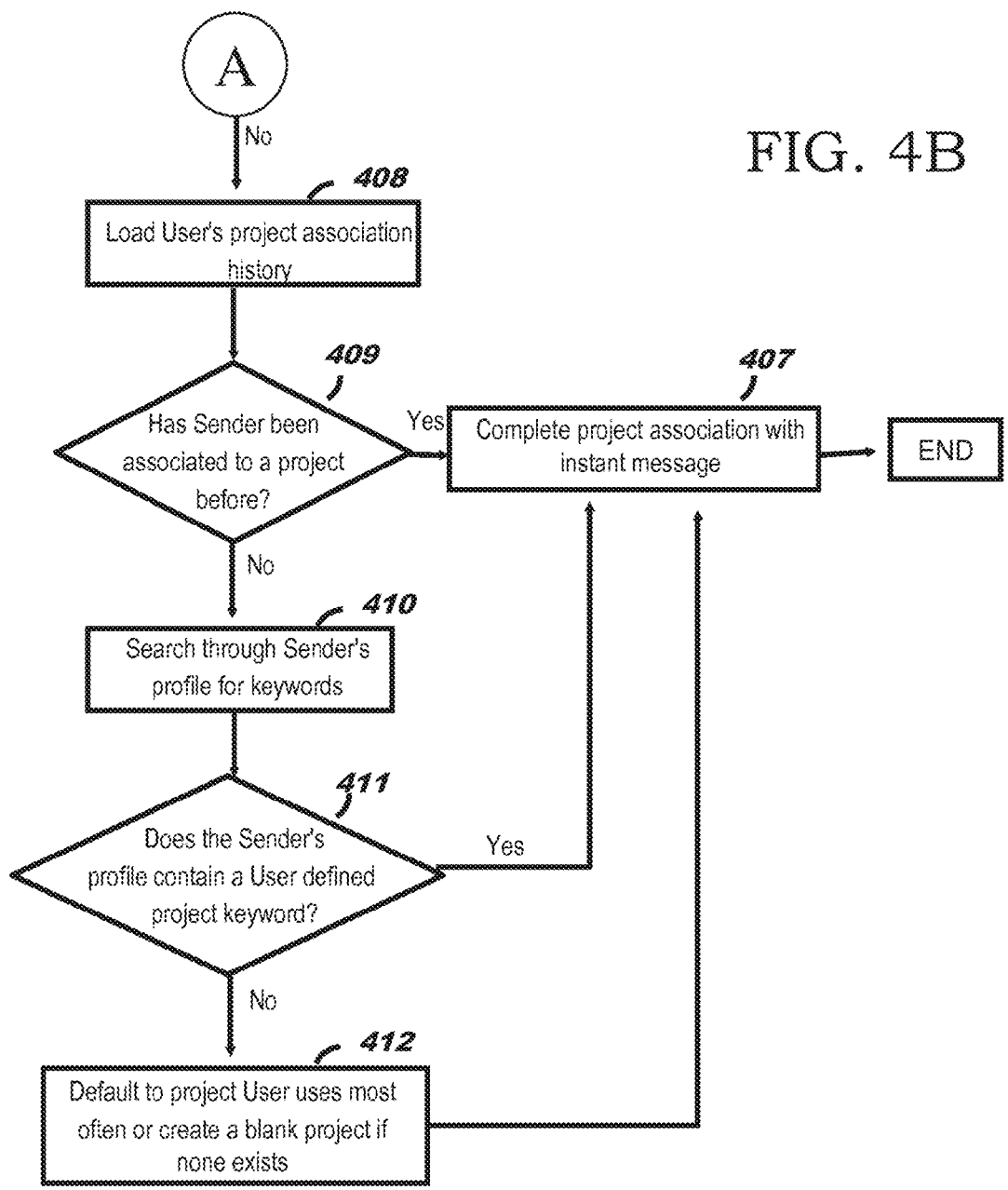

FIGS. 4A and 4B show additional processing steps in accordance with the invention. At step 402, the program control loads the user's local IM Time Tracker projects and settings, if any. For example, at this processing stage, the program control will load the user's project settings from the Project Settings component and will use these settings to create matches between an IM that is received and the associated project.

At step 403, the program control retrieves the sender's name from the IM. By example, as each received IM has a sender, the program control is configured to obtain the name of the sender from the IM client. At step 404, the program control makes a determination as to whether the sender exists in a defined project. In this decision, the program control determines if the sender's name (or other ID) has been associated with a project by looking through the previously loaded user's project settings. If a match is made and it is determined that the sender belongs to a project, the project and the sender is linked to make the proper association at step 407. At step 407, the program control completes the project association with the IM and places it in the format that will be needed for display on the instant message window or other portion of the display.

If a match is not found, the program control proceeds to step 405. At step 405, the program control obtains the text of the sender's IM. At step 406, the program control makes a determination as to whether the message contains any keywords associated with a project. In this processing stage, the program control retrieves the keywords that the user has associated with the defined projects and attempts to find these keywords in the IM. If a keyword match is found, the project associated with the keyword will be returned to step 407. Again, at step 407, the program control completes the project association with the IM and places it in the format that will be needed for display on the instant message window. Otherwise, the tool will proceed to step 408.

At step 408, the program control loads the user's project association history. In embodiments, the program control searches the list of previous associations that have been made to determine if the sender has been associated to a previous project. At step 409, the program control makes a determination as to whether the sender has been associated to a previous project. If the results show that the sender has been previously assigned to a project, the project with the most recent assignment will be returned at step 407. Otherwise, the tool will continue to step 410.

At step 410, the program control loads the sender's profile. In embodiments, the program control loads the sender's profile through the IM client or possibly from the Person/Group Information Directory. At step 415, the program control makes a determination as to whether the sender's profile contains a user defined project keyword. Thus, once the profile has been retrieved, the program control will search through the profile to determine if it can find any of the keywords that the user has associated with projects in the profile. If a match is made, the project associated with the found keyword is returned at step 407.

If no match is made, the program control proceeds to step 412. At step 412, the program control defaults to a project that the user most often uses or, alternatively, creates a blank project if none exists. Thus, since a match with a specific project could not be made, the program control will default to the most commonly used project for the user or, if no project exists, a blank project will be created and returned. In alternative embodiments, the program control will allow the user to select a project or create a new project.

Figure 5:
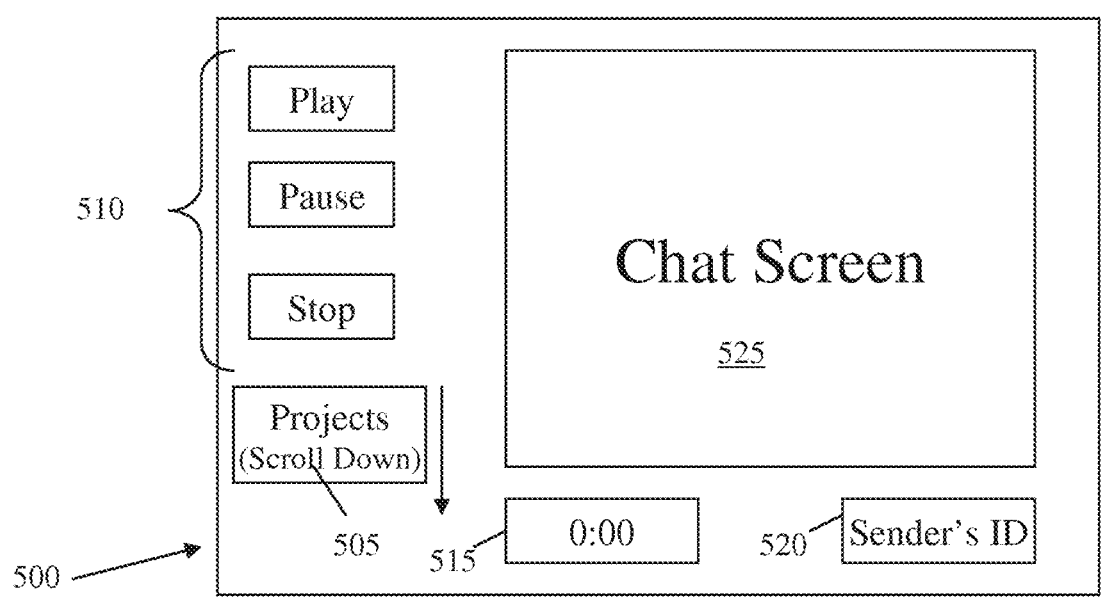
FIG. 5 shows an exemplary display implementing processes of the invention.

FIG. 5 shows an exemplary display implementing processes of the invention. As shown in this display, the IM is displayed on screen 500. A drop down display is provided at reference numeral 505. The drop down display 505 includes a list of projects. If necessary, projects can be added to the drop down display 505. Pause, stop and begin buttons are generally shown at reference numeral 510. In operation, the user can click on any of these button to pause, stop or begin the tracking of time during the chat session, respectively. The screen 500 also includes a time tracking component (e.g., time) 515, as well as a sender's ID 520 and a chat screen 525.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., A computer infrastructure that performs the process steps of the invention for one or more customers. In return, the service provider can receive payment from the customer(s) under a subscription and/or fee agreement and/or the service provider can receive payment from the sale of advertising content to one or more third parties.

In conclusion, in implementation, the system and method is configured to automatically associate a person contacting the user with a specific project. Once an association is made, the system and method of the invention will display the association to the user, allowing the user to change the association if it is not correct. Once a correct association is established, the system and method will track the amount of time spent on the session. The chat times, e.g., active session time, can be totaled and grouped by project to allow the user to quickly determine the amount of time spent on particular projects over a course of a day, week, month or other time period. This will allow the user to more accurately and easily track time for projects thus ensuring that time spent on a particular project is properly and accurately charged to a client.

While the invention has been described in terms of embodiments, those skilled in the art will recognize that the invention can be practiced with modifications and in the spirit and scope of the appended claims.

What is claimed is:

1. A method for billing for time spent in an instant message session by a service person for a project for a customer, said method comprising:
responsive to the instant message session during which an instant message is received by a user from a sender,
(i) retrieving, by one or more processors of a computer system, a name of the sender from the instant message which identifies the sender, and in response
(ii) determining, by the one or more processors, that the sender does not exist in a defined project, based on the retrieved sender's name not being in previously loaded project settings of the user that include an identification of the project, names of people associated with the project, and keywords associated with the project, and in response
(iii) determining, by the one or more processors, that the instant message does not contain any keywords associated with a project, and in response
(iv) determining, by the one or more processors, that the sender identified by the retrieved sender's name has not been associated with a previous project, and in response
(v) determining, by the one or more processors, that the sender identified by the retrieved sender's name has a profile that includes a keyword that the user has associated with a first project, and in response
(vi) associating, by the one or more processors, the first project with the instant message sent by the sender identified by the retrieved sender's name, and in response
(vii) determining, by the one or more processors, a charge to the first project for labor of the service person based on a duration of the instant message session and a billing rate for the service person for providing a service for the first project, wherein the user is the service person.

2. The method of claim 1, said method further comprising:
generating and electronically recording, by the one or more processors, a consolidated bill for the first project which includes the charge for labor of the service person and an additional charge for services other than for the labor of service person.

3. The method of claim 1, wherein said determining that the sender has not been associated with a previous project comprises searching the user's project association history to identify a list of previous associations of the user to determine that the list of previous associations do not include an association of the user to a project.

4. A computer program product, comprising one or more computer-readable storage devices and program instructions stored on the one or more storage devices, said program instructions which, upon being executed by one or more processors of a computer system, implement a method for billing for time spent in an instant message session by a service person for a project for a customer, said method comprising:
responsive to the instant message session during which an instant message is received by a user from a sender,
(i) retrieving, by the one or more processors, a name of the sender from the instant message which identifies the sender, and in response
(ii) determining, by the one or more processors, that the sender does not exist in a defined project, based on the retrieved sender's name not being in previously loaded project settings of the user that include an identification of the project, names of people associated with the project, and keywords associated with the project, and in response
(iii) determining, by the one or more processors, that the instant message does not contain any keywords associated with a project, and in response
(iv) determining, by the one or more processors, that the sender identified by the retrieved sender's name has not been associated with a previous project, and in response
(v) determining, by the one or more processors, that the sender identified by the retrieved sender's name has a profile that includes a keyword that the user has associated with a first project, and in response
(vi) associating, by the one or more processors, the first project with the instant message sent by the sender identified by the retrieved sender's name, and in response
(vii) determining, by the one or more processors, a charge to the first project for labor of the service person based on a duration of the instant message session and a billing rate for the service person for providing a service for the first project, wherein the user is the service person.

5. The computer program product of claim 4, said method further comprising:

generating and electronically recording, by the one or more processors, a consolidated bill for the first project which includes the charge for labor of the service person and an additional charge for services other than for the labor of service person.

6. The computer program product of claim 4, wherein said determining that the sender has not been associated with a previous project comprises searching the user's project association history to identify a list of previous associations of the user to determine that the list of previous associations do not include an association of the user to a project.

7. A computer system comprising:
one or more processors;
one or more computer-readable memories;
one or more computer-readable storage devices; and
program instructions stored on the one or more storage devices, said program instructions which, upon being executed by the one or more processors via the one or more memories, implement a method for billing for time spent in an instant message session by a service person for a project for a customer, said method comprising:
responsive to the instant message session during which an instant message is received by a user from a sender,
   (i) retrieving, by the one or more processors, a name of the sender from the instant message which identifies the sender, and in response
   (ii) determining, by the one or more processors, that the sender does not exist in a defined project, based on the retrieved sender's name not being in previously loaded project settings of the user that include an identification of the project, names of people associated with the project, and keywords associated with the project, and in response
   (iii) determining, by the one or more processors, that the instant message does not contain any keywords associated with a project, and in response
   (iv) determining, by the one or more processors, that the sender identified by the retrieved sender's name has not been associated with a previous project, and in response
   (v) determining, by the one or more processors, that the sender identified by the retrieved sender's name has a profile that includes a keyword that the user has associated with a first project, and in response
   (vi) associating, by the one or more processors, the first project with the instant message sent by the sender identified by the retrieved sender's name, and in response
   (vii) determining, by the one or more processors, a charge to the first project for labor of the service person based on a duration of the instant message session and a billing rate for the service person for providing a service for the first project, wherein the user is the service person.

8. The computer system of claim 7, said method further comprising:
generating and electronically recording, by the one or more processors, a consolidated bill for the first project which includes the charge for labor of the service person and an additional charge for services other than for the labor of service person.

9. The computer system of claim 7, wherein said determining that the sender has not been associated with a previous project comprises searching the user's project association history to identify a list of previous associations of the user to determine that the list of previous associations do not include an association of the user to a project.

* * * * *